(12) United States Patent
Nickel et al.

(10) Patent No.: US 9,604,586 B2
(45) Date of Patent: Mar. 28, 2017

(54) BUMPER STRUCTURE FOR A MOTOR VEHICLE

(71) Applicant: GM GLOBAL TECHNOLOGY OPERATIONS LLC, Detroit, MI (US)

(72) Inventors: Marco Nickel, Riedstadt (DE); Theobald Hock, Grossostheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/792,018

(22) Filed: Jul. 6, 2015

(65) Prior Publication Data
US 2016/0001722 A1    Jan. 7, 2016

(30) Foreign Application Priority Data
Jul. 4, 2014   (DE) .................... 10 2014 009 941

(51) Int. Cl.
*B60R 19/03*       (2006.01)
*B60R 19/18*       (2006.01)
(Continued)

(52) U.S. Cl.
CPC .............. *B60R 19/03* (2013.01); *B29C 51/12* (2013.01); *B60R 19/18* (2013.01); *B60R 19/34* (2013.01); *B60R 19/483* (2013.01); *B29C 51/08* (2013.01); *B29K 2105/08* (2013.01); *B29K 2105/256* (2013.01); *B29L 2031/3044* (2013.01); *B60R 2019/1853* (2013.01); *B60R 2019/1866* (2013.01); *B60R 2019/247* (2013.01)

(58) Field of Classification Search
CPC ......... B60R 19/02; B60R 19/03; B60R 19/26; B60R 19/34

USPC ......... 296/120, 132, 133; 293/120, 132, 133
See application file for complete search history.

(56) References Cited

U.S. PATENT DOCUMENTS 6,286,879 B1    9/2001   Haque et al.
6,669,252 B2 *  12/2003  Roussel .................. B60R 19/18
                                                   293/120
(Continued)

FOREIGN PATENT DOCUMENTS

DE       2460859 A1    6/1976
DE       3839855 A1    5/1990
(Continued)

OTHER PUBLICATIONS

English translation of JP 04-201753; retreived Jul. 20, 2016 via the Japan Platform for Patent Information located at https://www.j-platpat.inpit.go.jp/web/all/top/BTmTopEnglishPage.*

(Continued)

*Primary Examiner* — Jason S Daniels
(74) *Attorney, Agent, or Firm* — Lorenz & Kopf, LLP.

(57) ABSTRACT

A bumper cross member for a motor vehicle includes an insert of fiber-reinforced composite material and reinforcing structures molded onto the insert. A first groove is formed onto the insert, and the reinforcing structures include ribs formed in the first groove. The ribs extend inclined in relation to a longitudinal direction of the groove from one lateral wall of the groove to the other. The insert is further formed into a second groove, which are open toward opposing sides of the insert. The first and second grooves share a lateral wall. An outer bumper skin is supported by the bumper cross member.

9 Claims, 2 Drawing Sheets

(51) Int. Cl.
    *B29C 51/12*     (2006.01)
    *B60R 19/34*     (2006.01)
    *B60R 19/48*     (2006.01)
    *B29C 51/08*     (2006.01)
    *B29K 105/08*     (2006.01)
    *B29K 105/00*     (2006.01)
    *B29L 31/30*     (2006.01)
    *B60R 19/24*     (2006.01)

(56) References Cited

U.S. PATENT DOCUMENTS

| | | | |
|---|---|---|---|
| 8,177,269 | B2 | 5/2012 | Braunbeck et al. |
| 9,205,790 | B2 * | 12/2015 | Yabu ................. B60R 19/03 |
| 2009/0194902 | A1 | 8/2009 | Lee et al. |
| 2012/0306222 | A1 | 12/2012 | Choi et al. |
| 2013/0175813 | A1 * | 7/2013 | Mana ................. B60R 19/18 |
| | | | 293/120 |
| 2015/0015006 | A1 * | 1/2015 | Yabu ................. B60R 19/03 |
| | | | 293/120 |
| 2015/0129116 | A1 * | 5/2015 | Richeton ........... B60R 19/03 |
| | | | 156/180 |

FOREIGN PATENT DOCUMENTS

| | | |
|---|---|---|
| DE | 102005013635 A1 | 9/2006 |
| DE | 102009035777 A1 | 2/2011 |
| DE | 102009049213 A1 | 4/2011 |
| JP | 04201753 A * | 7/1992 |
| WO | 2010051865 A1 | 5/2010 |
| WO | 2014109128 A1 | 7/2014 |

OTHER PUBLICATIONS

English translation of WO 2014/109128; retreived Jul. 20, 2016 via PatentTranslate located at www.epo.org.*

German Patent Office, German Search Report for German Application No. 102014009941.5, dated Mar. 16, 2015.

Great Britain Patent Office, Great Britain Search Report for Great Britain Application No. 1510726.1, dated Dec. 11, 2015.

* cited by examiner

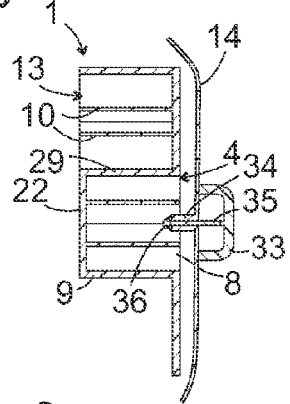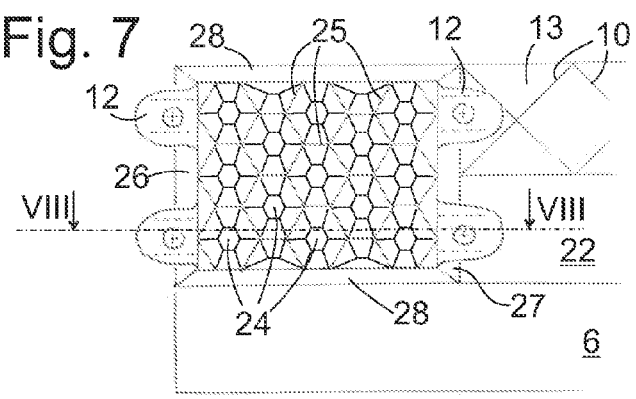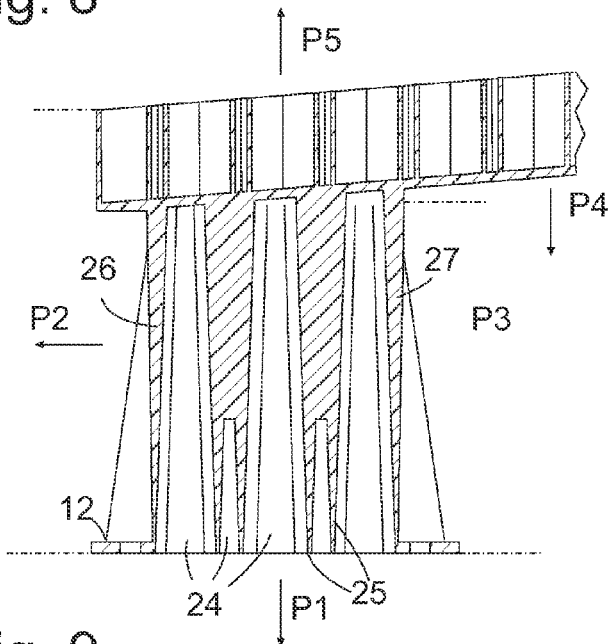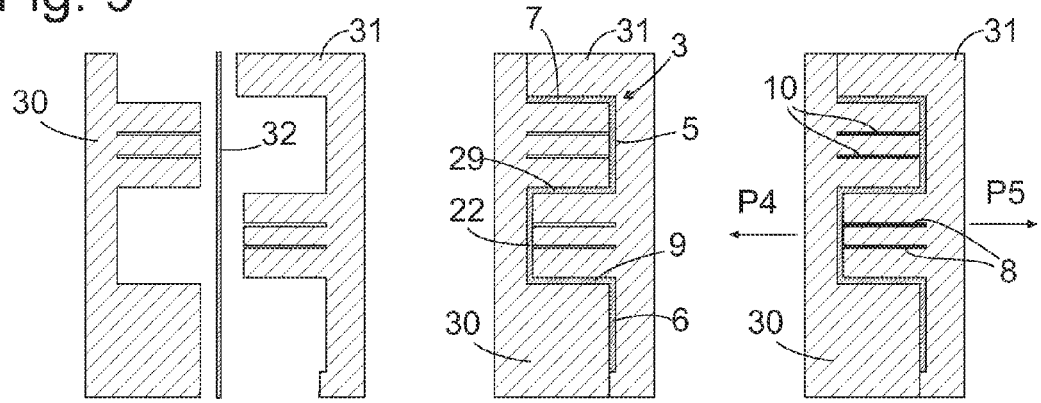

BUMPER STRUCTURE FOR A MOTOR VEHICLE

CROSS-REFERENCE TO RELATED APPLICATION

This application claims priority to German Patent Application No. 102014009941.5, filed Jul. 4, 2014, which is incorporated herein by reference in its entirety.

TECHNICAL FIELD

The present disclosure pertains to a bumper structure for a motor vehicle, in particular for its rear section.

BACKGROUND

Conventional bumper structures most often have a cross member made out of steel or aluminum. The steel cross members are most often assembled out of several parts, which even though making it possible to flexibly adjust the shape of the cross beam to the exterior skin of a bumper it is intended to support, at the same time makes manufacturing the cross beam complicated and correspondingly expensive. Aluminum cross members are most often designed as extruded profiles. While extruded profiles are easy and inexpensive to fabricate, they disadvantageously allow only a little flexibility in terms of shape, so that supporting the exterior skin of a bumper that does not conform precisely to the shape of the cross member requires additional components or processing steps, which cancels out the cost advantage of the extruded profile.

SUMMARY

In accordance with the present disclosure a bumper structure for a motor vehicle is provided which is inexpensive to manufacture, lightweight, and flexible with respect to its exterior shape.

In one embodiment, the bumper structure is a bumper cross member which encompasses an insert included of fiber-reinforced composite material, also referred to as organic sheet, and reinforcing structures injected onto the insert. The insert should extend over the entire height and width of the bumper cross member. In particular, a first groove can be formed onto the insert, wherein the reinforcing structures encompass ribs formed in the first groove. Especially if the ribs extend inclined in relation to a longitudinal direction of the groove from one lateral wall of the groove to the other, they can impart a high flexural rigidity to the latter or the bumper cross member.

In order to further increase the loading capacity of the bumper cross member, in particular during exposure to torsion loading, the insert can also be formed into a second groove. The grooves can be open toward opposing sides of the insert. The opposite orientation of the two grooves makes it possible for both grooves to share a lateral wall. As a result, a high stiffness can be achieved for the bumper cross member, despite the small cross sectional dimensions of the insert. If ribs of the second groove extend so as to lengthen one respective rib of the first groove, tensile and compressive forces can be efficiently transmitted over the entire vertical extension of the two grooves, which in turn contributes to the stiffness of the cross member.

While the bumper cross member should in general not be bent in varying directions as viewed from above for reasons of loading capacity, this is not necessarily always the case for the outer bumper skin it is intended to support. In particular, a central concavity provided on the outer bumper skin for attaching a license plate is often enveloped by convexly bent regions. In order to still be able to uniformly support the outer skin over the entire width of the bumper cross member, the ribs of the first groove open toward the bumper skin can project at least locally out of the groove against the outer bumper skin.

The ribs divide the first rib into a plurality of chambers open toward the outer skin of the bumper. These chambers can be used to accommodate sensors, for example distance sensors of a parking assistance system, protecting the latter against destruction during a crash. A sensor can be permanently installed in such a chamber; however, it is also conceivable, in particular if the ribs do not directly reach the outer skin of the bumper, for a sensor to form a projection attached to the outer skin of the bumper and inwardly projecting from the outer skin of the bumper, which retreats into the chamber during a crash, when the outer skin of the bumper is pressed against the ribs. Such a projection can also encompass components other than a sensor, e.g., a mounting boss having a decorative strip anchored thereto, or the like.

The reinforcing structures molded onto the insert stiffening structure can further encompass a crash box. To allow it to be molded as a single piece with the bumper cross member, the crash box should be open at one end facing away from the bumper cross member, and exhibit a wall thickness that tapers toward this open end. An interior space of the crash box should be expanded toward the open end in order to facilitate unmolding. A mounting flange can be molded onto the end of the crash box facing away from the bumper cross member for assembling the bumper structure to a body side member. The energy absorbing capacity of the crash box can be enhanced by a honeycomb structure formed in its interior.

The present disclosure further relates to a method for manufacturing a bumper structure, in which a blank made out of fiber-reinforced composite material is provided. The blank is deep drawn to obtain an insert. Reinforcing structures are molded onto the insert. Molding can take place efficiently and inexpensively in a mold that is also used for deep drawing the blank.

BRIEF DESCRIPTION OF THE DRAWINGS

The present disclosure will hereinafter be described in conjunction with the following drawing figures, wherein like numerals denote like elements, and:

FIG. 6 is a section similar to FIG. 4 according to another modification;

FIG. 7 is a partial view of a bumper cross member from the vehicle interior;

FIG. 8 is a section along the VIII-VIII plane shown in FIG. 7; and

FIG. 9 illustrates a method for manufacturing the bumper cross member.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
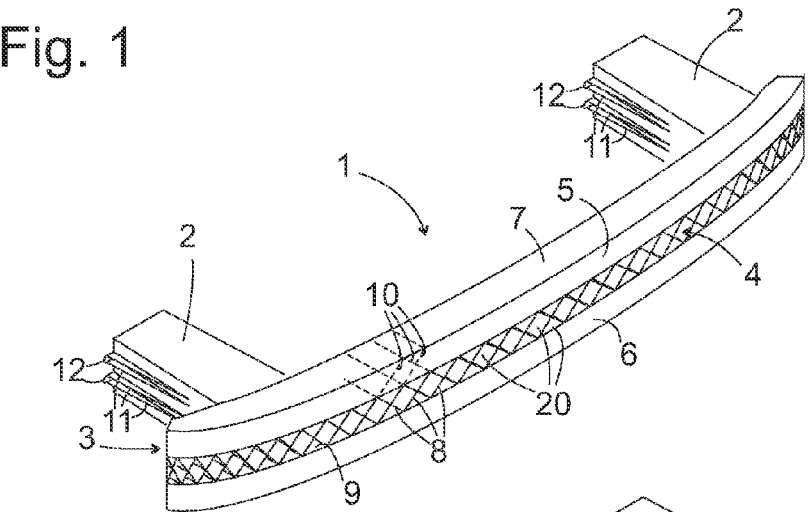
FIG. 1 is a perspective view of a bumper cross member according to a embodiment disclosed herein.

FIG. 1 shows a bumper cross member 1 and crash boxes 2 protruding from an interior side of the bumper cross member 1 according to an embodiment of the present disclosure. The bumper cross member 1 encompasses an insert 3 made out of thermoplastic sheet such as a fiber-reinforced composite material, which is deep drawn to form a groove 4 open toward the vehicle exterior as well as front walls 5, 6 above and below the groove 4. A horizontal wall 7 of the insert 3 extending from the upper edge of the upper front wall 5 toward the vehicle interior forms an upper lateral wall of a second groove, which is open toward the vehicle interior, and thus not visible on FIG. 1.

Numerous ribs 8 extend in the groove 4 between a lower lateral wall 9 and an upper lateral wall not visible on FIG. 1, which simultaneously forms the lower lateral wall of the inwardly open groove behind the front wall 5. The injection molded ribs 8 consist of a thermoplastic material that is chemically compatible or chemically identical to the thermoplastic matrix of the insert 3, so that it can form an intimate, flush bond with the insert 3 when molded onto the latter.

The ribs 8 each extend inclined by 45° against the horizontal, intersect in the middle of the groove 4, and meet each other in respective pairs at the lower lateral wall 9 and upper lateral wall. As exemplarily denoted by dashed lines on FIG. 1, ribs 10 of the upper groove each include an extension of the ribs 8.

The crash boxes 2 consist of the same thermoplastic material as the ribs 8, and just as the latter are molded onto the insert 3 as a single piece. The crash boxes 2 each are shaped like squares that slightly taper inwardly from the vehicle interior, whose front sides facing away from the bumper cross member 1 are open and flanked by screw flanges 12 for attachment to known side members of a motor vehicle body not shown on the figure. Elongated ribs 11 formed on the lateral walls of the crash boxes 2 support the screw flange 12.

Figure 3:
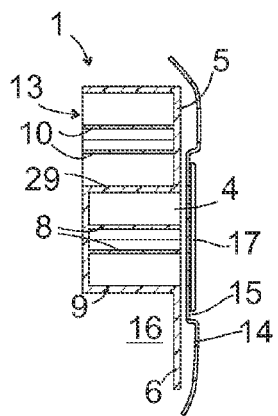
FIG. 3 is a section through a bumper structure with a cross member according to FIG. 1 or FIG. 2 along a central plane.

FIG. 3 shows a section through the bumper cross member 1 and the outer bumper skin 14 deep drawn out of a flat, plastic material along a central plane of mirror symmetry of the bumper cross member 1. The front edges of the ribs 8 are flush with the front walls 5, 6 bordering the groove 4 from above and below, and run spaced a slight distance apart from a central concavity 15 of the outer bumper skin 14 that accommodates a license plate 17. Mounting connections can dot the area between the outer bumper skin 14 and bumper cross member 1, but are not visible on FIG. 3, since they lie outside the sectional plane.

The groove open toward the vehicle interior is here marked 13, and reinforced by the ribs 10 distributed over its entire length in the same way as groove 4. The ribs 8, 10 meet each other at a shared lateral wall 29 of both grooves 4, 13.

The lower front wall 6 extends freely downward from the lower lateral wall 9 of the groove 4, so as to impart the vertical extension to the bumper cross member 1 that is required to ensure that the bumper cross member 1 can absorb collisions with different types of vehicles and bumpers arranged at varying heights. While the view on FIG. 3 does not show any reinforcing structures in the cove 16 bordered by the lateral wall and front wall 6, it should be understood that ribs or the like extending between the lateral wall 9 and front wall 6 could also be provided here, if so required for imparting the necessary stiffness to the front wall 6.

Figure 2:
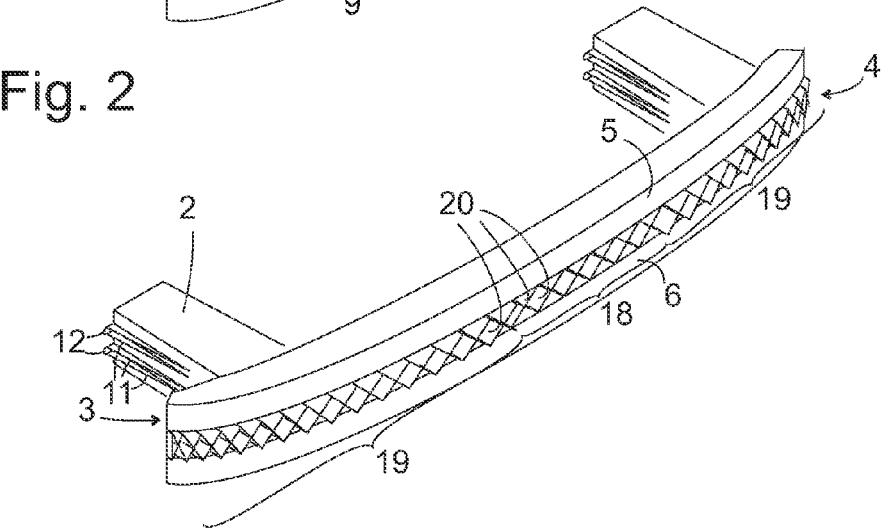
FIG. 2 is a view of a cross member similar to FIG. 1 according to another embodiment disclosed herein.

FIG. 2 shows a modified embodiment of the bumper cross member 1 in a view similar to the one on FIG. 1. The shape of the insert 3 is identical to the case depicted on FIG. 1, with the molded-on one-piece crash boxes 2 also being identical to those on FIG. 1. Three sections can be differentiated along the groove 4, namely a central section 18, in which front edges of the ribs 8 are flush with the front walls 5, 6, as well as lateral sections 19 to the left and right of the central section 18, in which the ribs 8 project beyond the front walls 5, 6. The central section is provided to accommodate the cavity 15 of the outer bumper skin 14, so that a cross section through the bumper structure according to this embodiment resembles the one shown on FIG. 3.

Figure 4:
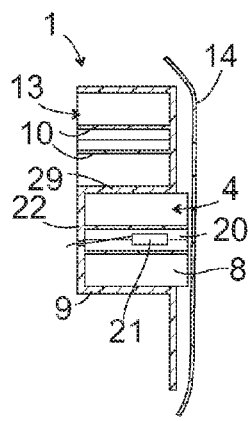
FIG. 4 is a section through a bumper structure with a cross member according to FIG. 2 along an eccentric sectional plane.

As evident from FIG. 4, which presents a section through a lateral section 19 of the bumper cross member 1 and outer bumper skin 14, the projecting ribs 8 are used to also provide tightly spaced support to the outer bumper skin 14 outside of the concavity 15, so that the ribs 8 are compressed during a collision, thereby already delaying the outer bumper skin 14 from reaching the front walls 5, 6.

As evident from FIGS. 1 and 2, the ribs 8 divide the groove 4 into a plurality of chambers 20 open toward the vehicle exterior, which here exhibit a triangular or diamond-shaped cross section. Some of these chambers 20 can be used to incorporate a sensor 21 as also depicted on FIG. 4, for example an ultrasound sensor of a parking assistance system. The sensor 21 is here recessed in the chamber 20 until behind the plane of the front walls 5, 6, so as to protect it against the consequences of a minor collision that only deforms the areas of the ribs 8 that project over the front walls 5, 6. Since the sensor 21 does not fill the entire depth of the chamber 20, but rather still leaves a free space between the sensor 21 and floor 22 of the groove 4 into which the sensor 21 can retreat when exposed to a force, the sensor 21 can potentially also survive intact during collisions that deform the insert 3, so that no repairs are necessary as long as the elastic limit of the bumper cross member 1 is not exceeded.

Figure 5:
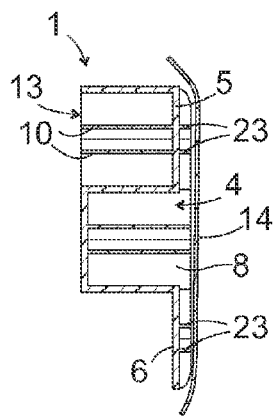
FIG. 5 is a section similar to FIG. 4 according to a modification of the bumper structure.

FIG. 5 shows a modification of the cross section depicted on FIG. 4, in which the distance between the bumper cross member 1 and outer skin 14 is diminished even at the height of the front walls 5, 6 by also forming flat ribs 23 on the front walls 5, 6 to extend the ribs 8.

In another modification shown on FIG. 6, a decorative or buffer strip 33 is anchored on the outer bumper skin 14 by having a mandrel 35 inwardly projecting from the strip 33 penetrate through a mounting boss 34, which is molded, adhesively bonded or otherwise attached to the interior of the outer bumper skin 14. Because the mounting boss 34 and the counter-hooks 36 of the mandrel 35 inwardly projecting over the end of the mounting boss 34 engage into a chamber 20, they can evade toward the vehicle interior during a minor impact without suffering any damage.

FIG. 7 shows part of the bumper cross member 1 with the crash box 2 molded thereto, as viewed from the vehicle interior in the longitudinal direction of the vehicle. The interior of the essentially box-shaped crash box 2 open toward the vehicle interior is filled by a structure included of hexagonal honeycombs 24. As particularly evident based on the longitudinal section shown on FIG. 8, the hollow spaces of the honeycombs 24 respectively taper toward the bumper cross member 1, or the thickness of the walls 25 of the honeycombs as well as of the outer walls 26, 27, 28 of the crash box 2 increase in the respective direction of the bumper cross member 1, so that, after the crash box 2 has been injection molded, a molding tool used for shaping the honeycombs 24 can be smoothly detached from the crash box 2 in the direction of an arrow P1. In the illustration on FIG. 8, the walls 25 extend until into the plane of the screw flange 12 molded onto the vertical outer walls 26, 27. In order to reduce the thickness of the walls 25 and thereby economize on weight, it may be best for the walls to end already before the plane of the screw flange 12.

After injection molding, the additional molding tools that abut against the outer walls 26, 27 of the crash box during the molding process are withdrawn in directions P2, P3 orthogonal to the arrow P1. After the molding tool has been removed from the outer wall 27, an additional molding tool can be withdrawn from the interior of the bumper cross member 1 in direction P4, which had there been used to shape the ribs 10 of the inwardly open groove 13. A molding tool used to shape the ribs 8 is removed toward the vehicle exterior, in direction P5. Since the ribs 10, 11 and walls 25 are all oriented in the longitudinal direction of the vehicle, a low number of movable molding tools is sufficient for injection molding the bumper cross member 1 and crash boxes 2 in a single operation.

FIG. 9 schematically depicts the sequence of a method for manufacturing the bumper cross member 1. It shows a respective two molding tools 30, 31 for shaping the interior or exterior of the bumper cross member 1. In a first stage shown in the left part of the figure, a blank 32 included of organic sheet is placed between the molding tools 30, 31. The molding tools 30, 31 are moved toward each other to shape the blank 32 via deep drawing to the insert 3. As visible in the middle part of the figure, the insert 3 fills in hollow spaces between the molding tools 30, 31 that correspond to the walls 5, 6, 7, 9, 22, 29, but not hollow spaces corresponding to the ribs 8, 10.

After the molding tools required for shaping the crash box 2 (outside the sectional plane on FIG. 9) have been placed, thermoplastic material is injected, forming the ribs 8, 10 and crash box, and superficially melds with the insert 3 in the process. As soon as the injected material has hardened sufficiently, the molding tools 28, 29 are withdrawn in the direction of the arrows P4, P5, and the finished bumper cross member 1 can be removed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A bumper structure for a motor vehicle comprising a bumper cross member having an insert of fiber-reinforced composite material and reinforcing structures molded onto the insert, and
    wherein at least one first groove is formed onto the insert, and the reinforcing structures encompass ribs formed in the first groove,
    wherein the ribs extend inclined in relation to a longitudinal direction of the at least one first groove from a first lateral wall of the at least one first groove to a second lateral wall,
    wherein the insert is further formed into a second groove, and the at least one first groove and second groove are open toward opposing sides of the insert,
    wherein the first and second grooves share a lateral wall, and
    wherein ribs of the second groove extend so as to lengthen one respective rib of the first groove.

2. The bumper structure according to claim 1, wherein the ribs formed in the first groove border at least one chamber, which incorporates a sensor at least in the event of a crash.

3. The bumper structure according to claim 1, wherein the ribs formed in the first groove border at least one chamber, which incorporates a projection of an outer bumper skin at least in the event of a crash.

4. The bumper structure according to claim 1, in which the reinforcing structures molded onto the insert further comprise a crash box.

5. The bumper structure according to claim 4 wherein a honeycomb structure is formed inside the crash box.

6. A bumper structure for a motor vehicle comprising
    a bumper cross member having an insert of fiber-reinforced composite material and reinforcing structures molded onto the insert, and
    wherein at least one first groove is formed onto the insert, and the reinforcing structures encompass ribs formed in the first groove; and
    further comprising an outer bumper skin supported by the bumper cross member, wherein the first groove is open toward the outer bumper skin, and the ribs formed in the first groove project out of the groove against the outer bumper skin at least in one section of the groove.

7. A bumper structure for a motor vehicle comprising
    a bumper cross member having an insert of fiber-reinforced composite material and reinforcing structures molded onto the insert,
    wherein the reinforcing structures molded onto the insert further comprise a crash box,
    wherein one outer wall of the crash box comprises a tapering wall thickness toward an open end of the crash box facing away from the bumper cross member.

8. The bumper structure according to claim 7, in which the outer wall of the crash box is reinforced by longitudinal ribs at least in an area facing away from the bumper cross member.

9. The bumper structure according to claim 8, in which a mounting flange is molded onto the end of the crash box facing away from the bumper cross member.

* * * * *